Aug. 8, 1967     J. L. NOLL     3,334,853
SUNSHADE SUPPORT ASSEMBLY
Filed Feb. 15, 1966
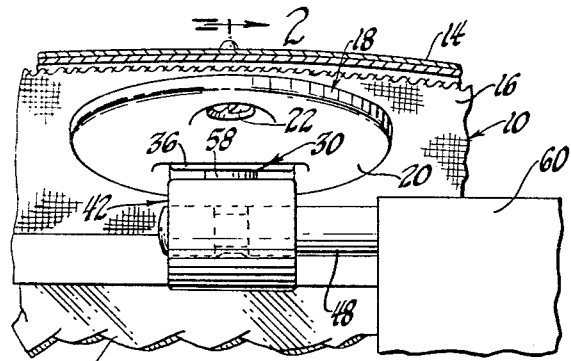
Fig. 1
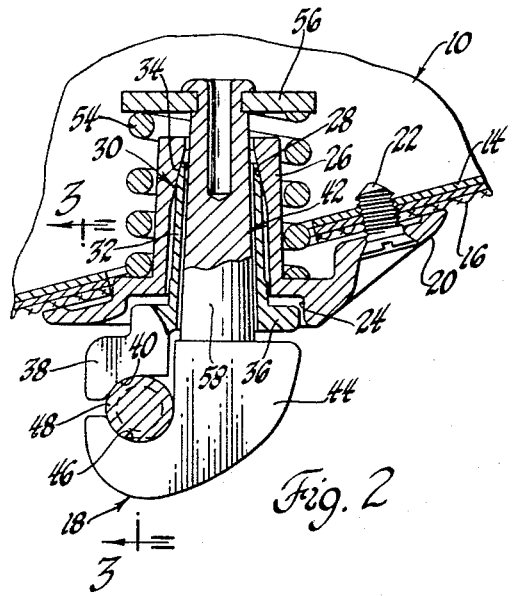
Fig. 2
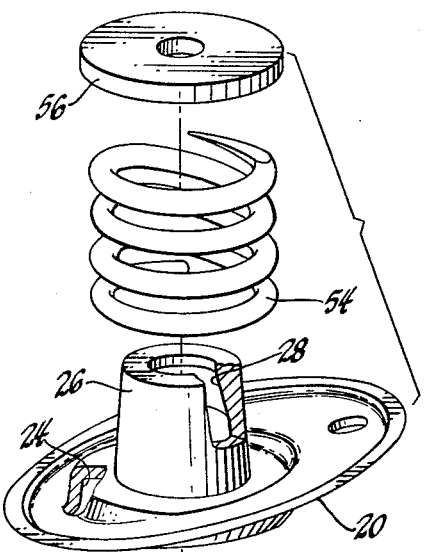
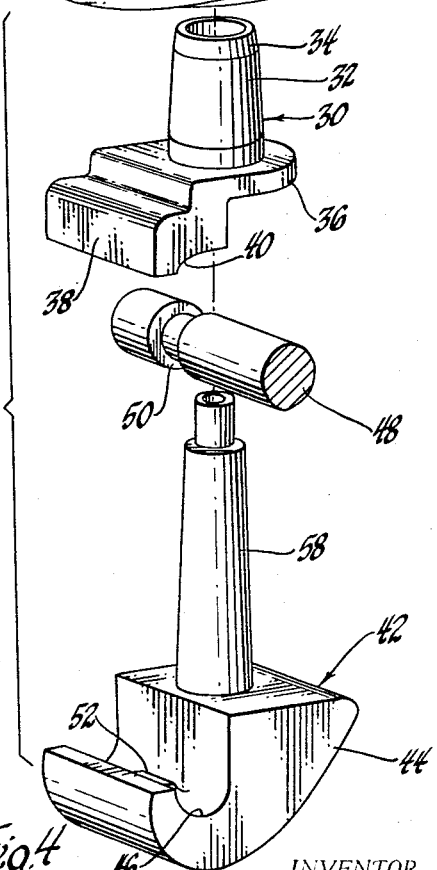
Fig. 4
Fig. 3
INVENTOR.
James L. Noll
BY
Herbert Furman
ATTORNEY United States Patent Office 3,334,853
Patented Aug. 8, 1967

3,334,853
SUNSHADE SUPPORT ASSEMBLY
James L. Noll, Livonia, Mich., assignor to General Motors Corporation, Detroit, Mich., a corporation of Delaware
Filed Feb. 15, 1966, Ser. No. 527,418
5 Claims. (Cl. 248—289)

This invention relates to sunshade support assemblies and more particularly to a sunshade support assembly having improved means for mounting the support arm on the support means.

One feature of this invention is that it provides a sunshade support assembly which includes a pair of support members resiliently clamping the support arm therebetween and being rotatably mounted on the support means. Another feature of this invention is that the support members are located in telescopic relationship and resilient means bias clamping portions of the members toward each other to clamp the support arm therebetween. A further feature of this invention is that the mounting means includes a mounting member telescopically located with respect to the support members and having means thereon cooperating with means on one of the support members to limit telescopic movement of the one support member relative to the mounting member. Yet another feature of this invention is that resilient means interconnect the mounting member and the other of the support members to bias the cooperating limit means into engagement with each other and bias the other support member relative to the one support member to cause the clamping portions thereof to resiliently engage and clamp the support arm.

These and other features of the sunshade support assembly of this invention will be readily apparent from the following specification and drawings wherein:

FIGURE 1 is a partial elevational view of a vehicle body embodying a sunshade support assembly according to this invention;

FIGURE 2 is an enlarged sectional view taken generally along the plane indicated by line 2—2 of FIGURE 1;

FIGURE 3 is an enlarged sectional view taken generally along the plane indicated by line 3—3 of FIGURE 2; and FIGURE 4 is a partially cut away exploded perspective view.

Referring now particularly to FIGURE 1 of the drawings, a vehicle body designated generally 10 includes a windshield 12, the upper end of which is mounted in the body header structure 14 which is concealed from view from the interior of the body by headlining 16.

A sunshade support assembly 18 according to this invention includes an annular escutcheon or mounting member 20 which is bolted at 22 to the header structure 14 through the headlining 16. The mounting member 20 is shaped to conform to the header 14 and includes an annular inset portion or recess 24 and an annular tubular portion 26 which extends through an opening in the header structure 14. Portion 26 includes an inwardly tapered annular or frusto-conically shaped wall portion 28 for a purpose to be described.

A first support member 30 includes an annular portion 32 telescopically received within the annular portion 26 of member 20 and including a tapered end portion 34 which is complementary in shape to the portion 28 of member 20 and seats thereagainst, the remainder of the annular portion 32 being spaced from the annular portion 26 of member 20. At the lower end thereof the member 30 includes an annular flange 36 located in recess 24 and from which depends a clamping portion 38 provided with a groove or support arm receiving portion 40.

A second support member 42 is telescopically received within the member 30 and includes at its lower end a clamping portion 44 provided with a groove or support arm receiving portion 46 which is located oppositely of the portion 36 of the member 30. A support arm 48 is received between the clamping portions 38 and 44 of the support members and is resiliently clamped therebetween as will be described. In order to prevent longitudinal shifting movement of the arm 48 relative to the support members, the arm is provided with an annular groove 50 adjacent the end thereof which receives a lug 52 provided in the groove 46 as can be seen in FIGURES 3 and 4.

A coil compression spring 54 having ground ends seats between the base wall of the recess 24 and a washer 56 which is staked on the upper end of the tapered body portion 58 of member 42. Spring 54 biases member 42 inwardly of members 20 and 30 to bias the clamping portion 44 of member 42 against the support arm 48. This in turn biases the support arm against the clamping portion 38 of member 30 so that the clamping portions clamp or frictionally engage the support arm and resist rotational movement thereof. The support arm mounts a conventional sunshade 60 and by rotating the support arm relative to the clamping portions, the sunshade can be located in any desired position.

The mating engagement between the portions 28 and 34 acts to limit movement of the member 30 within the member 20 to locate flange 36 within recess 24. The frictional engagement of these portions under the action of spring 54 locate the members 30 and 42 in any rotative position relative to member 20 to which they have been adjusted.

Thus, the spring 54 acts to provide a resilient bias for locating the support members in various rotative positions and also provides a resilient bias for locating the support arm in various rotative positions relative to the support members.

Thus, this invention provides an improved sunshade support assembly.

I claim:

1. A sunshade support assembly for mounting a sunshade on a vehicle body comprising, in combination, a pair of support members, said members each including a clamping portion, a support arm received between said clamping portions, means biasing said support members relative to each other to cause said clamping portions to frictionally engage said support arm and mount said arm on said members for movement therewith and movement relative thereto, and means rotatably mounting said support members on said body for movement relative thereto as a unit.

2. A sunshade support assembly as recited in claim 1 wherein said rotatable mounting means includes a mounting member adapted to be mounted on a vehicle body and having an annular portion and said support members each include an annular portion telescopically received within said mounting member annular portion, said biasing means being engageable with said mounting member and one of said support members to bias said one support member within said other support member and bias said support members within said mounting member annular portion.

3. The combination recited in claim 2 wherein said other support member includes means engageable with means on said mounting member annular portion to limit movement relative thereto.

4. The combination recited in claim 1 wherein said support arm and one of said support members include means limiting longitudinal movement of said support arm relative to said support members.

5. The combination recited in claim 2 wherein said mounting member annular portion includes a tapered portion and said other of said support members includes a complementary tapered portion engageable therewith to limit movement of said support members relative to said mounting member.

References Cited

UNITED STATES PATENTS

| | | | |
|---|---|---|---|
| 1,190,502 | 7/1916 | Anderson | 248—296 X |
| 2,316,290 | 4/1943 | Schenbeck | 248—316.2 |
| 2,540,584 | 2/1951 | Jaycox | 248—42 |
| 3,182,329 | 5/1965 | Biesecker | 248—40 X |

ROY D. FRAZIER, *Primary Examiner.*

JOHN PETO, *Examiner.*